US012710526B2

(12) United States Patent
Jackobson et al.

(10) Patent No.: US 12,710,526 B2
(45) Date of Patent: Aug. 18, 2026

(54) DATA FUSION FOR ENVIRONMENTAL MODEL GENERATION

(71) Applicant: AUTOBRAINS TECHNOLOGIES LTD, Tel Aviv-Jaffa (IL)

(72) Inventors: Omer Jackobson, Tel Aviv (IL); Kessem Meir, Tel-Aviv (IL); Tomer Livne, Tel Aviv (IL); Oz Sharlin, Tel Aviv (IL); Kirill Diagilev, Troy, NY (US); Roman Shklyar, Holon (IL); Yarden Zohar, Tel Aviv (IL); Matan Ron, Tel-Aviv (IL); Michael Khoshahang, Rishon LeZiyon (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 464 days.

(21) Appl. No.: 18/155,735

(22) Filed: Jan. 18, 2023

(65) Prior Publication Data

US 2023/0228863 A1 Jul. 20, 2023

Related U.S. Application Data

(60) Provisional application No. 63/266,866, filed on Jan. 18, 2022.

(51) Int. Cl.
*G01S 13/42* (2006.01)
*G05D 1/00* (2024.01)

(52) U.S. Cl.
CPC .......... *G01S 13/426* (2013.01); *G05D 1/0088* (2013.01); *G05D 1/0257* (2013.01)

(58) Field of Classification Search
CPC ...... G01S 13/426; G01S 13/867; G01S 17/89; G05D 1/0088; G05D 1/0257; G06T 7/70; G06V 20/58

(Continued)

(56) References Cited

U.S. PATENT DOCUMENTS

| | | | |
|---|---|---|---|
| 4,601,395 | A | 7/1986 | Juvinall et al. |
| 4,733,353 | A | 3/1988 | Jaswa |

(Continued)

FOREIGN PATENT DOCUMENTS

| | | | |
|---|---|---|---|
| AU | 2007201966 | B2 | 2/2010 |
| CN | 101539530 | A | 9/2009 |

(Continued)

OTHER PUBLICATIONS

"Computer Vision Demonstration Website", Electronics and Computer Science, University of Southampton, 2005, USA.

(Continued)

*Primary Examiner* — Nuzhat Pervin
(74) *Attorney, Agent, or Firm* — RECHES PATENTS

(57) ABSTRACT

A method for fusion of radar and visual information, the method comprises: obtaining visual information and radar information about a three dimensional (3D) space located within a field of view of a camera that acquired the visual information and within a field of view of a radar that acquired the radar information; finding, based on the visual information, estimated visual-detection-based (VDB) objects and estimated VDB locations of the estimated VDB objects within the 3D space; wherein the estimated VDB locations exhibit a distance ambiguity; determining hybrid-detection-based (HDB) objects and HDB locations of the HDB objects, based on (i) the radar information, (ii) the estimated VDB objects, and (iii) the estimated VDB locations of the VDB objects.

21 Claims, 7 Drawing Sheets

(58) Field of Classification Search
USPC .......................................................... 342/70
See application file for complete search history.

(56) References Cited

U.S. PATENT DOCUMENTS 4,932,645 A 6/1990 Schorey et al.
4,972,363 A 11/1990 Nguyen et al.
5,078,501 A 1/1992 Tekker et al.
5,214,746 A 5/1993 Fogel et al.
5,307,451 A 4/1994 Clark
5,369,773 A 11/1994 Hammerstrom
5,412,564 A 5/1995 Ecer
5,436,653 A 7/1995 Ellis et al.
5,568,181 A 10/1996 Greenwood et al.
5,638,425 A 6/1997 Meador, I et al.
5,745,678 A 4/1998 Herzberg et al.
5,754,938 A 5/1998 Herz et al.
5,763,069 A 6/1998 Jordan
5,806,061 A 9/1998 Chaudhuri et al.
5,835,087 A 11/1998 Herz et al.
5,835,901 A 11/1998 Duvoisin et al.
5,852,435 A 12/1998 Vigneaux et al.
5,870,754 A 2/1999 Dimitrova et al.
5,873,080 A 2/1999 Coden et al.
5,887,193 A 3/1999 Takahashi et al.
5,926,812 A 7/1999 Hilsenrath et al.
5,978,754 A 11/1999 Kumano
5,991,306 A 11/1999 Burns et al.
5,999,637 A 12/1999 Toyoda et al.
6,052,481 A 4/2000 Grajski et al.
6,070,167 A 5/2000 Qian et al.
6,076,088 A 6/2000 Paik et al.
6,122,628 A 9/2000 Castelli et al.
6,128,651 A 10/2000 Cezar
6,137,911 A 10/2000 Zhilyaev
6,144,767 A 11/2000 Bottou et al.
6,147,636 A 11/2000 Gershenson
6,163,510 A 12/2000 Lee et al.
6,243,375 B1 6/2001 Speicher
6,243,713 B1 6/2001 Nelson et al.
6,275,599 B1 8/2001 Adler et al.
6,314,419 B1 11/2001 Faisal
6,329,986 B1 12/2001 Cheng
6,381,656 B1 4/2002 Shankman
6,411,229 B2 6/2002 Kobayashi
6,422,617 B1 7/2002 Fukumoto et al.
6,459,991 B1 10/2002 Takiguchi et al.
6,507,672 B1 1/2003 Watkins et al.
6,523,046 B2 2/2003 Liu et al.
6,524,861 B1 2/2003 Anderson
6,546,405 B2 4/2003 Gupta et al.
6,550,018 B1 4/2003 Abonamah et al.
6,557,042 B1 4/2003 He et al.
6,594,699 B1 7/2003 Sahai et al.
6,601,026 B2 7/2003 Appelt et al.
6,611,628 B1 8/2003 Sekiguchi et al.
6,618,711 B1 9/2003 Ananth
6,643,620 B1 11/2003 Contolini et al.
6,643,643 B1 11/2003 Lee et al.
6,665,657 B1 12/2003 Dibachi
6,681,032 B2 1/2004 Bortolussi et al.
6,704,725 B1 3/2004 Lee
6,732,149 B1 5/2004 Kephart
6,742,094 B2 5/2004 Igari
6,751,363 B1 6/2004 Natsev et al.
6,751,613 B1 6/2004 Lee et al.
6,754,435 B2 6/2004 Kim
6,763,069 B1 7/2004 Divakaran et al.
6,763,519 B1 7/2004 McColl et al.
6,774,917 B1 8/2004 Foote et al.
6,795,818 B1 9/2004 Lee
6,804,356 B1 10/2004 Krishnamachari
6,813,395 B1 11/2004 Kinjo
6,819,797 B1 11/2004 Smith et al.
6,877,134 B1 4/2005 Fuller et al.
6,901,207 B1 5/2005 Watkins
6,938,025 B1 8/2005 Lulich et al.
6,985,172 B1 1/2006 Rigney et al.
7,013,051 B2 3/2006 Sekiguchi et al.
7,020,654 B1 3/2006 Najmi
7,023,979 B1 4/2006 Wu et al.
7,043,473 B1 5/2006 Rassool et al.
7,158,681 B2 1/2007 Persiantsev
7,215,828 B2 5/2007 Luo
7,260,564 B1 8/2007 Lynn et al.
7,289,643 B2 10/2007 Brunk et al.
7,299,261 B1 11/2007 Oliver et al.
7,302,089 B1 11/2007 Smits
7,302,117 B2 11/2007 Sekiguchi et al.
7,313,805 B1 12/2007 Rosin et al.
7,340,358 B2 3/2008 Yoneyama
7,346,629 B2 3/2008 Kapur et al.
7,353,224 B2 4/2008 Chen et al.
7,376,672 B2 5/2008 Weare
7,383,179 B2 6/2008 Alves et al.
7,433,895 B2 10/2008 Li et al.
7,464,086 B2 12/2008 Black et al.
7,529,659 B2 5/2009 Wold
7,577,656 B2 8/2009 Kawai et al.
7,657,100 B2 2/2010 Gokturk et al.
7,660,468 B2 2/2010 Gokturk et al.
7,805,446 B2 9/2010 Potok et al.
7,860,895 B1 12/2010 Scofield et al.
7,872,669 B2 1/2011 Darrell et al.
7,921,288 B1 4/2011 Hildebrand
7,933,407 B2 4/2011 Keidar et al.
8,023,739 B2 9/2011 Hohimer et al.
8,026,944 B1 9/2011 Sah
8,266,185 B2 9/2012 Raichelgauz et al.
8,285,718 B1 10/2012 Ong et al.
8,312,031 B2 11/2012 Raichelgauz et al.
8,315,442 B2 11/2012 Gokturk et al.
8,345,982 B2 1/2013 Gokturk et al.
8,386,400 B2 2/2013 Raichelgauz et al.
8,396,876 B2 3/2013 Kennedy et al.
8,418,206 B2 4/2013 Bryant et al.
8,442,321 B1 5/2013 Chang et al.
8,457,827 B1 6/2013 Ferguson et al.
8,495,489 B1 7/2013 Everingham
8,605,947 B2 * 12/2013 Zhang .................... G08G 1/167 348/148
8,635,531 B2 1/2014 Graham et al.
8,655,801 B2 2/2014 Raichelgauz et al.
8,655,878 B1 2/2014 Kulkarni et al.
RE44,963 E 6/2014 Shannon
8,799,195 B2 8/2014 Raichelgauz et al.
8,799,196 B2 8/2014 Raichelquaz et al.
8,818,916 B2 8/2014 Raichelgauz et al.
8,868,861 B2 10/2014 Shimizu et al.
8,886,648 B1 11/2014 Procopio et al.
8,954,887 B1 2/2015 Tseng et al.
8,990,199 B1 3/2015 Ramesh et al.
9,007,197 B2 * 4/2015 Breed ..................... G01S 19/41 340/436
9,009,086 B2 4/2015 Raichelgauz et al.
9,104,747 B2 8/2015 Raichelgauz et al.
9,165,406 B1 10/2015 Gray et al.
9,235,557 B2 1/2016 Raichelgauz et al.
9,286,623 B2 3/2016 Raichelgauz et al.
9,311,308 B2 4/2016 Sankarasubramaniam et al.
9,323,754 B2 4/2016 Ramanathan et al.
9,392,324 B1 7/2016 Maltar et al.
9,416,499 B2 8/2016 Cronin et al.
9,466,068 B2 10/2016 Raichelgauz et al.
9,646,006 B2 5/2017 Raichelgauz et al.
9,677,898 B2 * 6/2017 Ko ...................... G06V 20/588
9,679,062 B2 6/2017 Schillings et al.
9,807,442 B2 10/2017 Bhatia et al.
9,863,928 B1 1/2018 Peterson et al.
9,875,445 B2 1/2018 Amer et al.
9,953,533 B1 4/2018 Graves
9,953,535 B1 4/2018 Canavor et al.
9,984,369 B2 5/2018 Li et al.
10,048,700 B1 8/2018 Curlander et al.

(56) References Cited

U.S. PATENT DOCUMENTS 10,081,368 B1 * 9/2018 Lowry .................. B60W 50/08
10,157,291 B1 12/2018 Kenthapadi et al.
10,235,771 B2 * 3/2019 Rad ........................ G06V 20/20
10,235,882 B1 3/2019 Aoude et al.
10,253,468 B1 4/2019 Linville et al.
10,254,395 B2 * 4/2019 Nichols ................... G01S 13/86
10,282,623 B1 * 5/2019 Ziyaee ................. G06V 10/764
10,317,522 B2 * 6/2019 Tong ..................... G01S 13/878
10,395,332 B1 8/2019 Konrardy et al.
10,414,398 B2 9/2019 Ochi
10,416,670 B1 9/2019 Fields et al.
10,417,914 B1 9/2019 Vose et al.
10,444,346 B2 * 10/2019 Voorheis ................. G01S 13/66
10,445,896 B1 * 10/2019 Bills ...................... H04N 23/21
10,467,893 B1 11/2019 Soryal et al.
10,545,023 B1 1/2020 Herbach et al.
10,684,626 B1 6/2020 Martin
10,916,124 B2 2/2021 Geisler
10,922,788 B1 2/2021 Yu et al.
10,967,877 B2 4/2021 Asakura et al.
11,009,590 B2 * 5/2021 Laur ....................... G01S 13/58
11,054,515 B2 * 7/2021 Cohen ..................... G01S 13/58
11,170,201 B2 * 11/2021 Choi ...................... G06V 20/58
11,189,071 B2 * 11/2021 Park ........................ G06T 13/40
11,346,933 B2 * 5/2022 Panzer .................. G01S 13/931
11,508,122 B2 * 11/2022 Baik .................... G05D 1/2435
11,557,085 B2 * 1/2023 Boyce ..................... G06T 17/00
11,754,666 B2 * 9/2023 Zhang ..................... G01S 7/295
342/195
11,782,126 B2 * 10/2023 van Meurs ............ G01S 7/4026
342/113
12,158,518 B2 * 12/2024 Unnikrishnan ......... G01S 7/417
12,189,026 B1 * 1/2025 Alferdaous Alazem ....................
G01S 7/403
12,265,902 B2 * 4/2025 Isele ..................... G01S 7/4808
12,579,796 B2 * 3/2026 Möller .................. G01S 13/865
2001/0019633 A1 9/2001 Tenze et al.
2001/0034219 A1 10/2001 Hewitt et al.
2001/0038876 A1 11/2001 Anderson
2002/0004743 A1 1/2002 Kutaragi et al.
2002/0010682 A1 1/2002 Johnson
2002/0010715 A1 1/2002 Chinn et al.
2002/0019881 A1 2/2002 Bokhari et al.
2002/0032677 A1 3/2002 Morgenthaler et al.
2002/0038299 A1 3/2002 Zernik et al.
2002/0042914 A1 4/2002 Walker et al.
2002/0072935 A1 6/2002 Rowse et al.
2002/0087530 A1 7/2002 Smith et al.
2002/0087828 A1 7/2002 Arimilli et al.
2002/0091947 A1 7/2002 Nakamura
2002/0107827 A1 8/2002 Benitez-Jimenez et al.
2002/0113812 A1 8/2002 Walker et al.
2002/0126002 A1 9/2002 Patchell
2002/0126872 A1 9/2002 Brunk et al.
2002/0129140 A1 9/2002 Peled et al.
2002/0147637 A1 10/2002 Kraft et al.
2002/0157116 A1 10/2002 Jasinschi
2002/0163532 A1 11/2002 Thomas et al.
2002/0174095 A1 11/2002 Lulich et al.
2002/0181336 A1 12/2002 Shields
2002/0184505 A1 12/2002 Mihcak et al.
2003/0004966 A1 1/2003 Bolle et al.
2003/0005432 A1 1/2003 Ellis et al.
2003/0037010 A1 2/2003 Schmelzer
2003/0041047 A1 2/2003 Chang et al.
2003/0089216 A1 5/2003 Birmingham et al.
2003/0093790 A1 5/2003 Logan et al.
2003/0101150 A1 5/2003 Agnihotri et al.
2003/0105739 A1 6/2003 Essafi et al.
2003/0110236 A1 6/2003 Yang et al.
2003/0115191 A1 6/2003 Copperman et al.
2003/0126147 A1 7/2003 Essafi et al.
2003/0140257 A1 7/2003 Peterka et al.
2003/0145002 A1 7/2003 Kleinberger et al.
2003/0158839 A1 8/2003 Faybishenko et al.
2003/0165269 A1 9/2003 Fedorovskaya et al.
2003/0174859 A1 9/2003 Kim
2003/0184598 A1 10/2003 Graham
2003/0200217 A1 10/2003 Ackerman
2003/0217335 A1 11/2003 Chung et al.
2003/0229531 A1 12/2003 Heckerman et al.
2004/0095376 A1 5/2004 Graham et al.
2004/0098671 A1 5/2004 Graham et al.
2004/0111432 A1 6/2004 Adams et al.
2004/0117638 A1 6/2004 Monroe
2004/0128511 A1 7/2004 Sun et al.
2004/0153426 A1 8/2004 Nugent
2004/0162820 A1 8/2004 James et al.
2004/0257233 A1 12/2004 Proebsting
2004/0267774 A1 12/2004 Lin et al.
2005/0021394 A1 1/2005 Miedema et al.
2005/0080788 A1 4/2005 Murata
2005/0114198 A1 5/2005 Koningstein et al.
2005/0131884 A1 6/2005 Gross et al.
2005/0149369 A1 7/2005 Sevdermish
2005/0163375 A1 7/2005 Grady
2005/0172130 A1 8/2005 Roberts
2005/0177372 A1 8/2005 Wang et al.
2005/0193093 A1 9/2005 Mathew et al.
2005/0226511 A1 10/2005 Short
2005/0238198 A1 10/2005 Brown et al.
2005/0238238 A1 10/2005 Xu et al.
2005/0249398 A1 11/2005 Khamene et al.
2005/0256820 A1 11/2005 Dugan et al.
2005/0262428 A1 11/2005 Little et al.
2005/0281439 A1 12/2005 Lange
2005/0289163 A1 12/2005 Gordon et al.
2005/0289590 A1 12/2005 Cheok et al.
2006/0004745 A1 1/2006 Kuhn et al.
2006/0015580 A1 1/2006 Gabriel et al.
2006/0020958 A1 1/2006 Allamanche et al.
2006/0033163 A1 2/2006 Chen
2006/0050993 A1 3/2006 Stentiford
2006/0069668 A1 3/2006 Braddy et al.
2006/0074588 A1 4/2006 Blodgett et al.
2006/0080311 A1 4/2006 Potok et al.
2006/0093190 A1 5/2006 Cheng et al.
2006/0112035 A1 5/2006 Cecchi et al.
2006/0129822 A1 6/2006 Snijder et al.
2006/0217818 A1 9/2006 Fujiwara
2006/0217828 A1 9/2006 Ticken
2006/0218191 A1 9/2006 Gopalakrishnan
2006/0224529 A1 10/2006 Kermani
2006/0236343 A1 10/2006 Chang
2006/0242130 A1 10/2006 Sadri et al.
2006/0248558 A1 11/2006 Barton et al.
2006/0251338 A1 11/2006 Gokturk et al.
2006/0253423 A1 11/2006 McLane et al.
2006/0267975 A1 11/2006 Moses et al.
2006/0288002 A1 12/2006 Epstein et al.
2007/0022374 A1 1/2007 Huang et al.
2007/0033170 A1 2/2007 Sull et al.
2007/0038614 A1 2/2007 Guha
2007/0042757 A1 2/2007 Jung et al.
2007/0061302 A1 3/2007 Ramer et al.
2007/0067304 A1 3/2007 Ives
2007/0074147 A1 3/2007 Wold
2007/0081088 A1 4/2007 Gotoh et al.
2007/0083611 A1 4/2007 Farago et al.
2007/0091106 A1 4/2007 Moroney
2007/0130159 A1 6/2007 Gulli et al.
2007/0136782 A1 6/2007 Ramaswamy et al.
2007/0156720 A1 7/2007 Maren
2007/0244902 A1 10/2007 Seide et al.
2007/0253594 A1 11/2007 Lu et al.
2007/0282513 A1 12/2007 Michi et al.
2007/0294187 A1 12/2007 Scherrer
2007/0298152 A1 12/2007 Baets
2008/0006615 A1 1/2008 Rosario et al.
2008/0049789 A1 2/2008 Vedantham et al.
2008/0071465 A1 3/2008 Chapman et al.
2008/0072256 A1 3/2008 Boicey et al.
2008/0079729 A1 4/2008 Brailovsky
2008/0152231 A1 6/2008 Gokturk et al.

(56) References Cited

U.S. PATENT DOCUMENTS

2008/0159622 A1 7/2008 Agnihotri et al.
2008/0161986 A1 7/2008 Breed
2008/0165018 A1 7/2008 Breed
2008/0165861 A1 7/2008 Wen et al.
2008/0201299 A1 8/2008 Lehikoinen et al.
2008/0201314 A1 8/2008 Smith et al.
2008/0201361 A1 8/2008 Castro et al.
2008/0228749 A1 9/2008 Brown
2008/0228995 A1 9/2008 Tan et al.
2008/0237359 A1 10/2008 Silverbrook et al.
2008/0247543 A1 10/2008 Mick et al.
2008/0253737 A1 10/2008 Kimura et al.
2008/0263579 A1 10/2008 Mears et al.
2008/0270373 A1 10/2008 Oostveen et al.
2008/0294278 A1 11/2008 Borgeson et al.
2008/0307454 A1 12/2008 Ahanger et al.
2008/0313140 A1 12/2008 Pereira et al.
2009/0024641 A1 1/2009 Quigley et al.
2009/0037088 A1 2/2009 Taguchi
2009/0043637 A1 2/2009 Eder
2009/0096634 A1 4/2009 Emam et al.
2009/0125544 A1 5/2009 Brindley
2009/0157575 A1 6/2009 Schobben et al.
2009/0165031 A1 6/2009 Li et al.
2009/0172030 A1 7/2009 Schiff et al.
2009/0208106 A1 8/2009 Dunlop et al.
2009/0208118 A1 8/2009 Csurka
2009/0216761 A1 8/2009 Raichelgauz et al.
2009/0220138 A1 9/2009 Zhang et al.
2009/0232361 A1 9/2009 Miller
2009/0234878 A1 9/2009 Herz et al.
2009/0245573 A1 10/2009 Saptharishi et al.
2009/0254572 A1 10/2009 Redlich et al.
2009/0282218 A1 11/2009 Raichelgauz et al.
2009/0297048 A1 12/2009 Slotine et al.
2010/0010751 A1 1/2010 Blodgett et al.
2010/0010752 A1 1/2010 Blodgett et al.
2010/0030474 A1 2/2010 Sawada
2010/0035648 A1 2/2010 Huang
2010/0042646 A1 2/2010 Raichelgauz et al.
2010/0049374 A1 2/2010 Ferrin et al.
2010/0082684 A1 4/2010 Churchill et al.
2010/0104184 A1 4/2010 Bronstein et al.
2010/0104199 A1* 4/2010 Zhang .................... G08G 1/166 382/199
2010/0125569 A1 5/2010 Nair et al.
2010/0161652 A1 6/2010 Bellare et al.
2010/0162405 A1 6/2010 Cook et al.
2010/0191391 A1 7/2010 Zeng
2010/0198626 A1 8/2010 Cho et al.
2010/0212015 A1 8/2010 Jin et al.
2010/0262609 A1 10/2010 Raichelgauz et al.
2010/0284604 A1 11/2010 Chrysanthakopoulos
2010/0293057 A1 11/2010 Haveliwala et al.
2010/0312736 A1 12/2010 Kello
2010/0318493 A1 12/2010 Wessling
2010/0325138 A1 12/2010 Lee et al.
2010/0325581 A1 12/2010 Finkelstein et al.
2011/0035373 A1 2/2011 Berg et al.
2011/0055585 A1 3/2011 Lee
2011/0060496 A1 3/2011 Nielsen et al.
2011/0077028 A1 3/2011 Wilkes, III et al.
2011/0164180 A1 7/2011 Lee
2011/0164810 A1 7/2011 Zang et al.
2011/0190972 A1 8/2011 Timmons et al.
2011/0216209 A1 9/2011 Fredlund et al.
2011/0218946 A1 9/2011 Stern et al.
2011/0276680 A1 11/2011 Rimon
2011/0296315 A1 12/2011 Lin et al.
2011/0307542 A1 12/2011 Wang et al.
2012/0041969 A1 2/2012 Priyadarshan et al.
2012/0131454 A1 5/2012 Shah
2012/0136853 A1 5/2012 Kennedy et al.
2012/0155726 A1 6/2012 Li et al.
2012/0167133 A1 6/2012 Carroll et al.
2012/0179642 A1 7/2012 Sweeney et al.
2012/0185445 A1 7/2012 Borden et al.
2012/0207346 A1 8/2012 Kohli et al.
2012/0219191 A1 8/2012 Benzarti et al.
2012/0221470 A1 8/2012 Lyon
2012/0227074 A1 9/2012 Hill et al.
2012/0239690 A1 9/2012 Asikainen et al.
2012/0239694 A1 9/2012 Avner et al.
2012/0265735 A1 10/2012 McMillan et al.
2012/0294514 A1 11/2012 Saunders et al.
2012/0299961 A1 11/2012 Ramkumar et al.
2012/0301105 A1 11/2012 Rehg et al.
2012/0331011 A1 12/2012 Raichelgauz et al.
2013/0043990 A1 2/2013 Al-Jafar
2013/0066856 A1 3/2013 Ong et al.
2013/0067364 A1 3/2013 Berntson et al.
2013/0086499 A1 4/2013 Dyor et al.
2013/0089248 A1 4/2013 Remiszewski et al.
2013/0151522 A1 6/2013 Aggarwal et al.
2013/0159298 A1 6/2013 Mason et al.
2013/0211705 A1 8/2013 Geelen et al.
2013/0226930 A1 8/2013 Arngren et al.
2013/0227023 A1 8/2013 Raichelgauz et al.
2013/0283401 A1 10/2013 Pabla et al.
2013/0346412 A1 12/2013 Raichelgauz et al.
2014/0019264 A1 1/2014 Wachman et al.
2014/0025692 A1 1/2014 Pappas
2014/0037138 A1 2/2014 Sato et al.
2014/0104051 A1* 4/2014 Breed .................... G06V 20/56 340/435
2014/0125703 A1 5/2014 Roveta et al.
2014/0139670 A1 5/2014 Kesavan et al.
2014/0147829 A1 5/2014 Jerauld
2014/0149918 A1 5/2014 Asokan et al.
2014/0152698 A1 6/2014 Kim et al.
2014/0156691 A1 6/2014 Conwell
2014/0169681 A1 6/2014 Drake
2014/0176604 A1 6/2014 Venkitaraman et al.
2014/0193077 A1 7/2014 Shiiyama et al.
2014/0195093 A1 7/2014 Litkouhi et al.
2014/0198986 A1 7/2014 Marchesotti
2014/0201126 A1 7/2014 Zadeh et al.
2014/0201330 A1 7/2014 Lopez et al.
2014/0236414 A1 8/2014 Droz et al.
2014/0247342 A1 9/2014 Ellenby et al.
2014/0250032 A1 9/2014 Huang et al.
2014/0282655 A1 9/2014 Roberts
2014/0288453 A1 9/2014 Liu et al.
2014/0297171 A1* 10/2014 Minemura ............. B60R 21/34 342/70
2014/0300722 A1 10/2014 Garcia
2014/0328512 A1 11/2014 Gurwicz et al.
2014/0330830 A1 11/2014 Raichelgauz et al.
2014/0341476 A1 11/2014 Kulick et al.
2014/0363044 A1 12/2014 Williams et al.
2015/0052089 A1 2/2015 Kozloski et al.
2015/0057869 A1 2/2015 Healey et al.
2015/0071457 A1 3/2015 Burciu
2015/0100562 A1 4/2015 Kohlmeier et al.
2015/0117784 A1 4/2015 Lin et al.
2015/0120627 A1 4/2015 Hunzinger et al.
2015/0120760 A1 4/2015 Wang et al.
2015/0123968 A1 5/2015 Holverda et al.
2015/0127516 A1 5/2015 Studnitzer et al.
2015/0130643 A1 5/2015 Nagy
2015/0153735 A1 6/2015 Clarke et al.
2015/0166069 A1 6/2015 Engelman et al.
2015/0190284 A1 7/2015 Censo et al.
2015/0203116 A1 7/2015 Fairgrieve et al.
2015/0213325 A1 7/2015 Krishnamoorthi et al.
2015/0224988 A1 8/2015 Buerkle et al.
2015/0248586 A1 9/2015 Gaidon et al.
2015/0254344 A1 9/2015 Kulkarni et al.
2015/0266455 A1 9/2015 Wilson
2015/0286742 A1 10/2015 Zhang et al.
2015/0286872 A1 10/2015 Medioni et al.
2015/0293976 A1 10/2015 Guo et al.
2015/0324356 A1 11/2015 Gutierrez et al.
2015/0332588 A1 11/2015 Bulan et al.

(56) References Cited

U.S. PATENT DOCUMENTS

2016/0007083 A1 1/2016 Gurha
2016/0026707 A1 1/2016 Ong et al.
2016/0046298 A1 2/2016 Deruyck et al.
2016/0078339 A1 3/2016 Li et al.
2016/0116573 A1* 4/2016 Appia .................. G01S 13/867 342/52
2016/0127641 A1 5/2016 Gove
2016/0132194 A1 5/2016 Grue et al.
2016/0133130 A1 5/2016 Grimm et al.
2016/0142625 A1 5/2016 Weksler et al.
2016/0193996 A1 7/2016 Stefan
2016/0221592 A1 8/2016 Puttagunta et al.
2016/0275766 A1 9/2016 Venetianer et al.
2016/0284095 A1 9/2016 Chalom et al.
2016/0302046 A1 10/2016 Velusamy
2016/0306798 A1 10/2016 Guo et al.
2016/0330394 A1 11/2016 Shahraray et al.
2016/0355181 A1 12/2016 Teraoka et al.
2016/0379091 A1 12/2016 Lin et al.
2017/0007521 A1 1/2017 Monsonis et al.
2017/0008521 A1 1/2017 Braunstein et al.
2017/0017638 A1 1/2017 Satyavarta et al.
2017/0018178 A1 1/2017 Poechmueller et al.
2017/0072851 A1 3/2017 Shenoy et al.
2017/0075036 A1 3/2017 Pikhletsky et al.
2017/0078621 A1 3/2017 Sahay et al.
2017/0090473 A1 3/2017 Cooper et al.
2017/0092122 A1 3/2017 Sharan
2017/0111576 A1 4/2017 Tojo et al.
2017/0136842 A1 5/2017 Anderson et al.
2017/0154241 A1 6/2017 Shambik et al.
2017/0180623 A1 6/2017 Lin
2017/0205506 A1* 7/2017 Voorheis ................ G01S 13/66
2017/0242117 A1* 8/2017 Izzat ...................... G01S 17/66
2017/0243370 A1 8/2017 Hoye et al.
2017/0254895 A1* 9/2017 Tong .................... G01S 13/867
2017/0263128 A1 9/2017 Chandran et al.
2017/0293296 A1 10/2017 Stenneth et al.
2017/0297401 A1 10/2017 Hrovat et al.
2017/0344023 A1 11/2017 Aubinger et al.
2017/0351268 A1 12/2017 Anderson et al.
2018/0022361 A1 1/2018 Rao et al.
2018/0025235 A1 1/2018 Fridman
2018/0046869 A1 2/2018 Cordell et al.
2018/0060690 A1 3/2018 Lee et al.
2018/0061253 A1 3/2018 Hyun
2018/0082591 A1 3/2018 Pandy
2018/0101177 A1 4/2018 Cohen
2018/0108258 A1 4/2018 Dilger
2018/0113461 A1 4/2018 Potnis et al.
2018/0144640 A1 5/2018 Price et al.
2018/0151073 A1 5/2018 Minemura et al.
2018/0157666 A1 6/2018 Raichelgauz et al.
2018/0157903 A1 6/2018 Tu et al.
2018/0170392 A1 6/2018 Yang et al.
2018/0174001 A1 6/2018 Kang
2018/0188366 A1* 7/2018 Kemmer ............. A01F 15/0825
2018/0188731 A1 7/2018 Matthiesen et al.
2018/0188746 A1 7/2018 Lesher et al.
2018/0189613 A1 7/2018 Wolf et al.
2018/0204335 A1 7/2018 Agata et al.
2018/0210462 A1 7/2018 Switkes et al.
2018/0218608 A1 8/2018 Offenhaeuser et al.
2018/0268292 A1 9/2018 Choi et al.
2018/0338229 A1 11/2018 Nemec et al.
2018/0348363 A1* 12/2018 Matsunaga ........... B60W 30/09
2018/0354505 A1 12/2018 Meier et al.
2018/0356817 A1 12/2018 Poeppel
2018/0373929 A1 12/2018 Ye
2019/0034764 A1 1/2019 Oh et al.
2019/0064929 A1 2/2019 Tomeh et al.
2019/0071093 A1 3/2019 Ma et al.
2019/0072965 A1 3/2019 Zhang et al.
2019/0072966 A1 3/2019 Zhang et al.
2019/0073908 A1 3/2019 Neubecker et al.
2019/0088135 A1 3/2019 Do et al.
2019/0096135 A1 3/2019 Mutto et al.
2019/0120955 A1* 4/2019 Zhong ................... G01S 13/931
2019/0139419 A1 5/2019 Wendt et al.
2019/0147259 A1 5/2019 Molin et al.
2019/0163198 A1* 5/2019 Niesen ............... G01C 21/1652
2019/0163204 A1 5/2019 Bai et al.
2019/0171912 A1 6/2019 Vallespi-Gonzalez et al.
2019/0193751 A1 6/2019 Fernando et al.
2019/0196471 A1 6/2019 Vaughn et al.
2019/0205798 A1 7/2019 Rosas-Maxemin et al.
2019/0213324 A1 7/2019 Thorn
2019/0220011 A1 7/2019 Penna
2019/0225214 A1 7/2019 Pohl et al.
2019/0246042 A1 8/2019 Liu
2019/0253614 A1 8/2019 Oleson et al.
2019/0279006 A1* 9/2019 Ozawa .................. G01S 13/931
2019/0279046 A1 9/2019 Han et al.
2019/0279293 A1 9/2019 Tang et al.
2019/0287515 A1 9/2019 Li et al.
2019/0291720 A1 9/2019 Xiao et al.
2019/0304102 A1 10/2019 Chen et al.
2019/0311226 A1 10/2019 Xiao et al.
2019/0315346 A1 10/2019 Yoo et al.
2019/0337521 A1 11/2019 Stauber
2019/0339840 A1* 11/2019 Park ........................ G06F 3/167
2019/0340924 A1 11/2019 Abari et al.
2019/0347492 A1 11/2019 Morimura et al.
2019/0355132 A1 11/2019 Kushleyev et al.
2019/0378006 A1 12/2019 Fukuda et al.
2019/0384303 A1 12/2019 Muller et al.
2019/0392831 A1 12/2019 Pohl
2020/0012871 A1 1/2020 Lee et al.
2020/0027002 A1 1/2020 Hickson et al.
2020/0027351 A1 1/2020 Gotoda et al.
2020/0027355 A1 1/2020 Sujan et al.
2020/0031337 A1* 1/2020 Soltanian ............. B60W 30/09
2020/0053262 A1 2/2020 Wexler et al.
2020/0074326 A1 3/2020 Balakrishnan et al.
2020/0086881 A1 3/2020 Abendroth et al.
2020/0090426 A1 3/2020 Barnes et al.
2020/0103523 A1* 4/2020 Liu ......................... G01S 13/87
2020/0110982 A1 4/2020 Gou et al.
2020/0117902 A1 4/2020 Wexler et al.
2020/0120267 A1 4/2020 Netto et al.
2020/0125927 A1 4/2020 Kim
2020/0156784 A1 5/2020 Carnell
2020/0175384 A1 6/2020 Zhang et al.
2020/0175550 A1 6/2020 Raichelgauz et al.
2020/0217950 A1* 7/2020 Unnikrishnan ....... G01S 17/931
2020/0219316 A1* 7/2020 Baik .................... G05D 1/2435
2020/0269864 A1 8/2020 Zhang et al.
2020/0272940 A1 8/2020 Sun et al.
2020/0293035 A1 9/2020 Sakurada et al.
2020/0302295 A1 9/2020 Tung et al.
2020/0304707 A1 9/2020 Williams et al.
2020/0324778 A1 10/2020 Diamond et al.
2020/0370890 A1 11/2020 Hamilton et al.
2020/0370920 A1* 11/2020 Ahmed ................... G01S 13/89
2020/0371228 A1* 11/2020 Wang .................... G01S 13/931
2020/0371518 A1 11/2020 Kang
2020/0410322 A1 12/2020 Naphade et al.
2021/0009270 A1 1/2021 Chen et al.
2021/0026003 A1* 1/2021 Panzer .................. G01S 13/931
2021/0041248 A1 2/2021 Li et al.
2021/0041555 A1* 2/2021 Zhong ................... G01S 13/931
2021/0049908 A1 2/2021 Pipe et al.
2021/0055741 A1 2/2021 Kawanai et al.
2021/0056492 A1 2/2021 Zass
2021/0056852 A1 2/2021 Lund et al.
2021/0096565 A1 4/2021 Xie et al.
2021/0097309 A1 4/2021 Kaku et al.
2021/0116560 A1* 4/2021 Gulati ..................... G01S 13/87
2021/0132213 A1* 5/2021 Advani ................ G01S 13/865
2021/0148831 A1 5/2021 Raichelgauz et al.
2021/0164177 A1 6/2021 Wientjes
2021/0182539 A1 6/2021 Rassool
2021/0192357 A1 6/2021 Sinha et al.
2021/0209332 A1 7/2021 Nishio et al.

(56) References Cited

U.S. PATENT DOCUMENTS

2021/0224917 A1 7/2021 Gaudin et al.
2021/0248904 A1 8/2021 Nguyen
2021/0266437 A1 8/2021 Wexler et al.
2021/0272207 A1 9/2021 Fields et al.
2021/0284183 A1 9/2021 Marenco et al.
2021/0284191 A1 9/2021 Raichelgauz et al.
2021/0316747 A1 10/2021 Klein
2021/0390351 A1 12/2021 Romain, II
2021/0390840 A1 12/2021 Rejal et al.
2021/0409593 A1 12/2021 Zacharias et al.
2022/0005291 A1 1/2022 Konrardy et al.
2022/0038620 A1 2/2022 Demers
2022/0058393 A1 2/2022 Calvert et al.
2022/0083841 A1* 3/2022 Isele ........................ G01S 17/89
2022/0126864 A1 4/2022 Moustafa et al.
2022/0128685 A1* 4/2022 Longman .............. G01S 13/584
2022/0161815 A1 5/2022 Beek et al.
2022/0187847 A1 6/2022 Cella et al.
2022/0191389 A1 6/2022 Lei
2022/0215508 A9* 7/2022 Harrison ................ G06N 3/045
2022/0234501 A1 7/2022 Odinaev et al.
2022/0286603 A1 9/2022 Lv et al.
2022/0308200 A1* 9/2022 Becker ..................... G06N 3/09
2022/0327886 A1 10/2022 Mathur et al.
2022/0345621 A1 10/2022 Shi et al.
2022/0404460 A1* 12/2022 Liu ......................... G01S 17/89
2023/0003871 A1* 1/2023 Qian ...................... G06N 20/00
2023/0003872 A1* 1/2023 Qian ..................... G01S 13/723
2023/0093680 A1* 3/2023 Song ....................... G01S 17/89 702/152
2023/0094836 A1* 3/2023 Kellner ................. G01S 13/426 342/52
2023/0112799 A1* 4/2023 Baik ....................... G06T 17/10 382/103
2023/0194692 A1* 6/2023 Zhou ....................... G01S 13/58
2023/0196510 A1* 6/2023 Harrison ................ G06N 20/00 382/100
2023/0204364 A1* 6/2023 Nachstedt ............. G01S 19/485 701/445
2023/0316571 A1* 10/2023 Kadambi .................. G06T 7/80 382/188
2023/0381625 A1* 11/2023 Imes ...................... G06V 20/49
2024/0118713 A1* 4/2024 Dean ........................ A61G 5/10

FOREIGN PATENT DOCUMENTS

CN 107472252 B 4/2022
CN 111866468 B 6/2022
DE 102012009297 A1 12/2012
DE 102016122686 A1 5/2018
EP 1085464 A3 1/2007
EP 3466070 B1 * 2/2021 .............. G06T 7/55
EP 3910540 A1 11/2021
JP 2018511807 A 4/2018
WO 0231764 A2 4/2002
WO 2003067467 A1 8/2003
WO 2005027457 A1 3/2005
WO 2007049282 A2 5/2007
WO 2014076002 A1 5/2014
WO 2014137337 A1 9/2014
WO 2014141282 A1 9/2014
WO 2016040376 A1 3/2016
WO 2016070193 A1 5/2016
WO 2018035145 A1 2/2018
WO 2018132088 A1 7/2018
WO WO-2019141100 A1 * 7/2019 ......... H04N 21/4438

OTHER PUBLICATIONS

Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
C. Huang et al., "ACT: An Autonomous Drone Cinematography System for Action Scenes," 2018 IEEE International Conference onRobotics and Automation (ICRA), 2018, pp. 7039-7046, doi: 10.1109/ICRA.2018.8460703. (Year: 2018).
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Galvane, Quentin, et al. "Automated cinematography with unmanned aerial vehicles." arXiv preprint arXiv:1712.04353 (2017). (Year: 2017).
Garcia, "Solving the Weighted Region Least Cost Path Problem Using Transputers", Naval Postgraduate School, Monterey, California, Dec. 1989.
Guo et al., AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, 133N 1327-2314.
Tu, Weiming, et al. "A survey on visual content-based video indexing and retrieval." IEEE Transactions on Systems, Man, andCybernetics, Part C (Applications and Reviews) 41.6 (2011 ): 797-819. (Year: 2011).
Huang, Chong, et al. "One-shot imitation filming of human motion videos." arXiv preprint arXiv:1912.10609 (2019). (Year: 2019).
J. Chen and P. Carr, "Mimicking Human Camera Operators," 2015 IEEE Winter Conference on Applications of Computer Vision, 2015, pp. 215-222, doi: 10.1109/WACV.2015.36. (Year: 2015).
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Joubert, Niels, et al. "Towards a drone cinematographer: Guiding quadrotor cameras using visual composition principles." arXivpreprint arXiv: 1610.01691 (2016). (Year: 2916).
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Li, Yijun, Jesse S. Jin, and Xiaofang Zhou. "Matching commercial clips from TV streams using a unique, robust and compactsignature." Digital Image Computing: Techniques and Applications (DICTA'05). IEEE, 2005. (Year: 2005).
Lin et al., "Generating robust digital signature for image/video authentication", Multimedia and Security Workshop at ACM Multimedia '98, Bristol, U.K., Sep. 1998, pp. 245-251.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
M. Gschwindt,, "Can a Robot Become a Movie Director? Learning Artistic Principles for Aerial Cinematography," 2019 IEEE/RSJw International Conference on Intelligent Robots and Systems (IROS), 2019, pp. 1107-1114, doi: 10.1109/IROS40897.2019.896759 (Year: 2019).

(56) References Cited

OTHER PUBLICATIONS

May et al., "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Retrieval, Story. Ehsan Younessian. Diss. Nanyang Technological University, 2013: i-187 (Year: 2013).
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("HIBRID-SOC: A Multi-Core SOC Architecture for Multimedia Signal Processing" 2003).
Stolberg et al., "HIBRID-SOC: A Mul Ti-Core SOC Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop On Parallel and Distributed Processing, 1996. PDP '96, pp. 274-281.
Vallet et al ("Personalized Content Retrieval in Context Using Ontological Knowledge" Mar. 2007) (Year: 2007).
Vallet, David, et al. "Personalized content retrieval in context using ontological knowledge." IEEE Transactions on circuits andsystems for video technology 17.3 (2007): 336-346. (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Yanai, Generic Image Classification Using Visual Knowledge on the Web, pp. 167-174 (Year: 2003).
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.

* cited by examiner 310
312
314
320
330
352
356
358

DATA FUSION FOR ENVIRONMENTAL MODEL GENERATION

BACKGROUND

Visual information may provide detailed information about appearances of objects but provides inaccurate distance information.

Radar information may provide accurate distance information but does not provide accurate information about the appearance of objects.

The provision of an accurate environmental model of an environment is one of the most important tasks related to autonomous driving (AD) and to advanced drive-assistance system (ADAS).

There is a growing need to provide a method that may provide an accurate environmental model of an environment.

SUMMARY

There may be provided a method, system and non-transitory computer readable medium for generating an environmental model of an environment.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
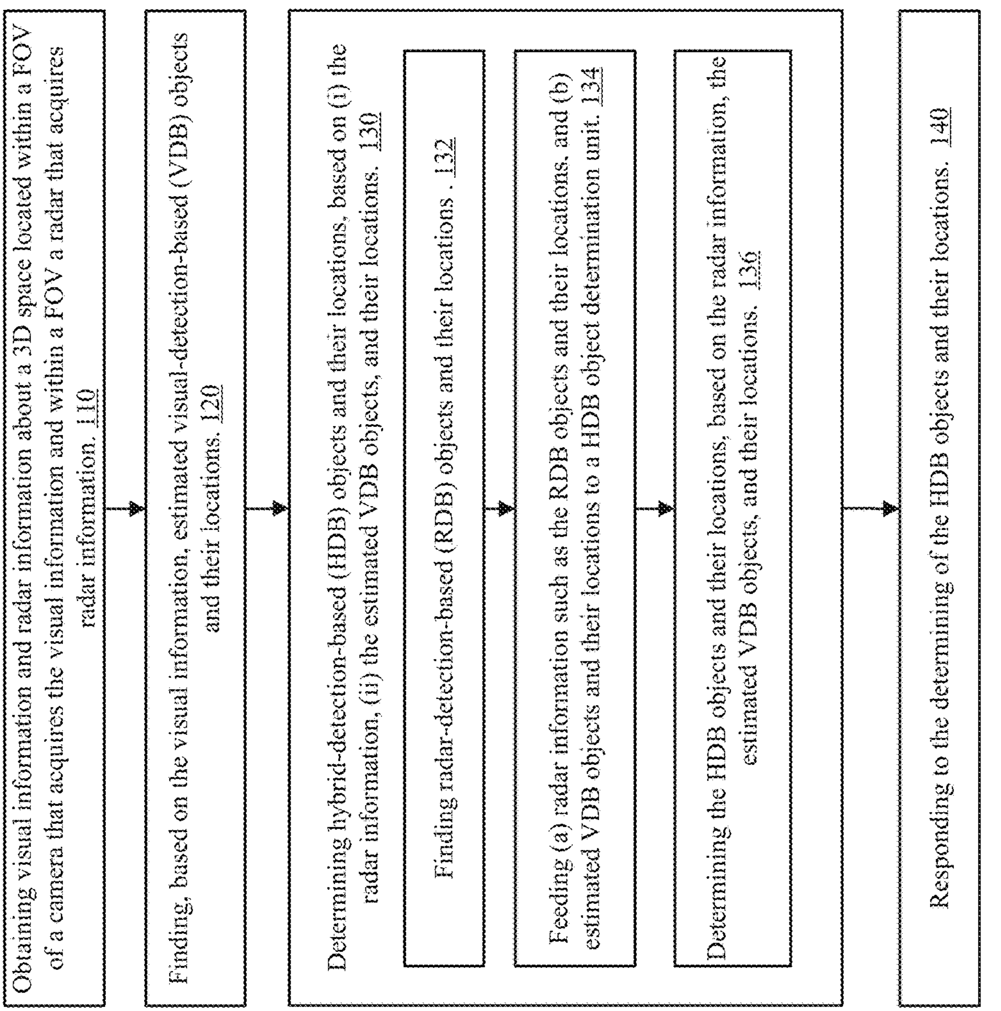
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a system, method and non-transitory computer readable medium that adjusts the autonomous driving pattern to a desired comfort level of one or more persons within a vehicle. The adjustment can be done in an automatic manner (without human intervention) and especially in an unsupervised manner—thus providing a highly efficient and accurate manner to tailor the autonomous driving patterns.

There may be provided a system, method and non-transitory computer readable medium for fusing radar and visual information.

A visual-detection-based (VDB) object is an object that is detected and having its location determined based solely on visual information.

A radar-detection-based (RDB) object is an object that is detected and having its location determined based solely on radar information.

A hybrid-detection-based (HDB) object is an object that is detected and having its location determined based on a combination of radar information and visual information.

FIG. 1 illustrates an example of a method 100 for fusion of radar and visual information.

Method 100 may start by step 110 of obtaining visual information and radar information about a three dimensional (3D) space located within a field of view (FOV) of a camera that acquired the visual information and within a field of view of a radar that acquired the radar information. The 3D space may be an overlap between the FOV of the camera and the FOV of the radar.

The camera obtained 2D visual information—and the estimation of distances based solely on the visual information is inaccurate—it exhibits a distance ambiguity.

The distance ambiguity may be represented as a range inaccuracy of a certain percent of a visual based range estimation or as a certain amount of distance.

When visual-detection based objects are illustrated within a angle range space—the distance ambiguity may be represented by a radial line having a length that represents the distance ambiguity, wherein the radial line passes through an estimated range of the object.

Step 110 may be followed by step 120 of finding, based on the visual information, estimated visual-detection-based (VDB) objects and their locations. The estimated VDB locations exhibit a distance ambiguity.

Step 120 may be followed by step 130 of determining hybrid-detection-based (HDB) objects and their locations, based on (i) the radar information, (ii) the estimated VDB objects, and their locations.

Step 130 may include step 132 of finding radar-detection-based (RDB) objects and their locations.

Step 132 may include or may be preceded by aggregating radar points from different points of time within a time window. For example—the radar points acquired during multiple consecutive radar scans can be aggregated.

Step 132 may be followed by step 134 of feeding (a) radar information such as the RDB objects and their locations, and (b) estimated VDB objects and their locations to a HDB object determination unit.

Step 134 may be followed by step 136 of determining the HDB objects and their locations, based on the radar information, the estimated VDB objects, and their locations.

Step 136 may include at least one out of:

a. Solving the distance ambiguity of the estimated VDB locations using the radar information.
b. Searching for RDB objects within regions of interest defined by the estimated VDB locations and the distance ambiguity of the estimated VDB locations.
c. Pairing RDB objects with VDB objects to provide the HDB objects and their locations.

Step 136 may first include:

a. Performing a single object based search of determining a HDB object based on a near VDB object.
b. Performing a multiple object based search for finding, based on multiple VDB objects and multiple RDB object for the best matching VDB and RDB objects therefor finding the best HDB objects.

Step 130 may be followed by step 140 of responding to the determining of the HDB objects and their locations.

Step 140 may include at least one out of:

a. Displaying the information about the HDB objects and their locations.
b. Generating and/or storing and/or transmitting the information about the HDB objects and their locations.
c. Using the information about the HDB objects and their locations to augment a display of objects to a user.
d. Sending the information about the HDB objects and their locations to another processor.
e. Sending the information about the HDB objects and their locations to another sensor.
f. Fusing the information about the HDB objects and their locations with sensed data from another sensor.
g. Validating the information about the HDB objects and their locations using other information—for example a map of the environment of any other source of data regarding the environment of the vehicle.
h. Controlling at least one of a transmission scheme and a reception scheme of the radar and/or the camera—for example selecting an illumination pattern for illuminating certain objects within the field of view of the radar, amending the scan rate of the radar, entering an idle mode, changing a mode of operation of the radar, or setting any other TX/RX parameter of the radar.
i. Performing an autonomous driving operation—including but not limited to autonomously driving the vehicle, performing an autonomous ADAS operation—for example performing an autonomous breaking operation, changing a speed and/or direction of the vehicle, taking control for a limited period of time such as for less than a second for one or few seconds and returning the control to a human driver, and the like.
j. Instructing (or requesting) an autonomous driving module of a vehicle (the autonomous driving module is responsible to execute autonomous driving operations) to perform an autonomous driving operation.
k. Transmitting a request (or an instruction) to the autonomous driving module of a vehicle to perform an autonomous driving operation.
l. Instructing (or requesting) an ADAS module of a vehicle (the ADAS module is responsible to execute ADAS operations) to perform an ADAS operation.
m. Transmitting a request (or an instruction) to the ADAS module of a vehicle to perform an ADAS operation.
n. Providing information about the object.
o. Suggesting a driving path to a human driver.
p. Sending requests or instructions to a semi-autonomous module of a vehicle.

Figure 2:
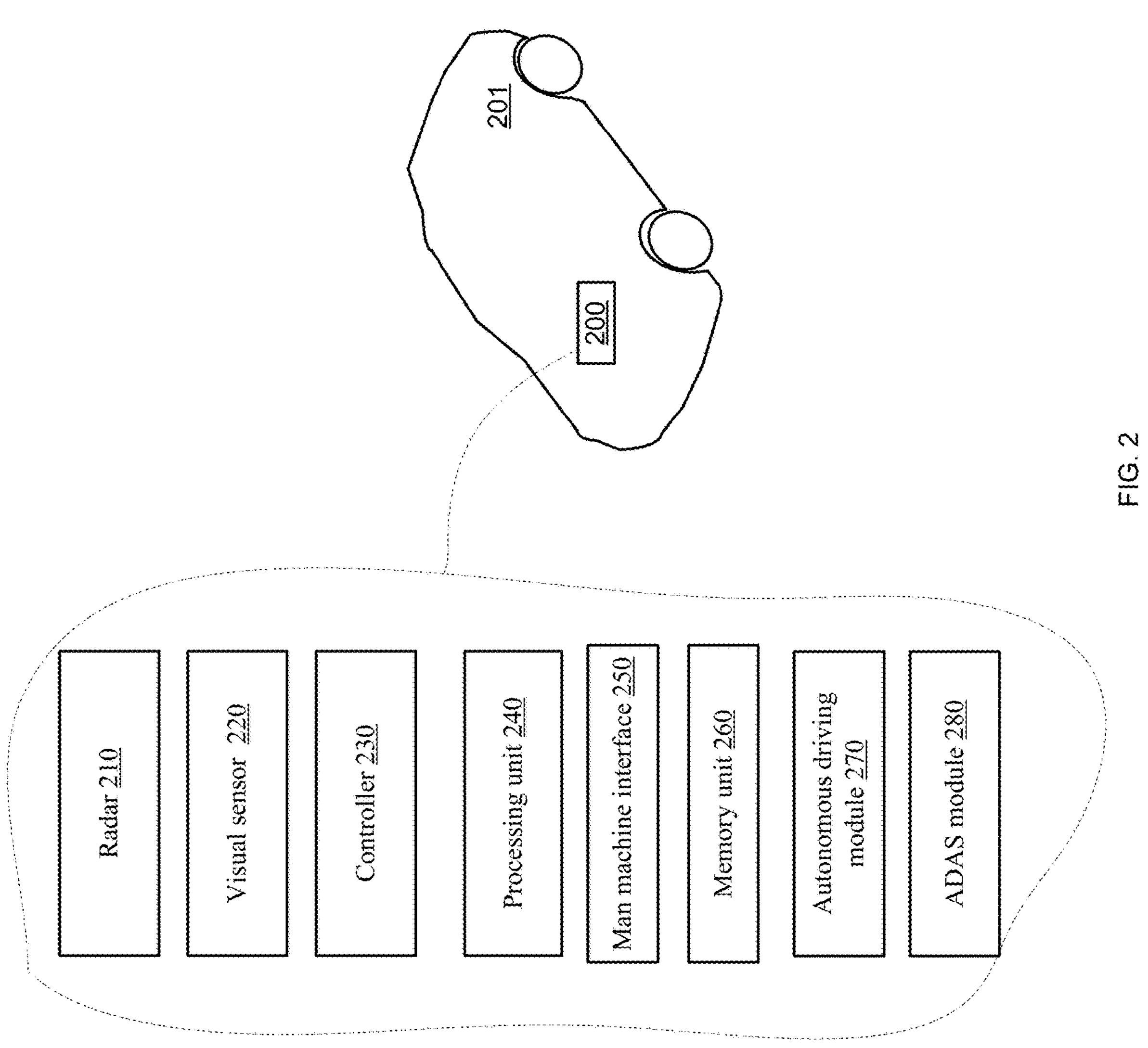
FIG. 2 illustrates an example of a system.

FIG. 2 illustrates a system 200 of vehicle 201.

System may include radar 210. visual sensor 220 such as a camera, controller 230, processing unit 240, man machine interface such as display 250, memory unit 260, autonomous driving module 270 and ADAS module 280.

The autonomous driving module 270, and ADAS module 280 may respond to road-boundary information generated by the processing unit 240.

The controller 230 may control the operation of the system 200.

Figure 3:
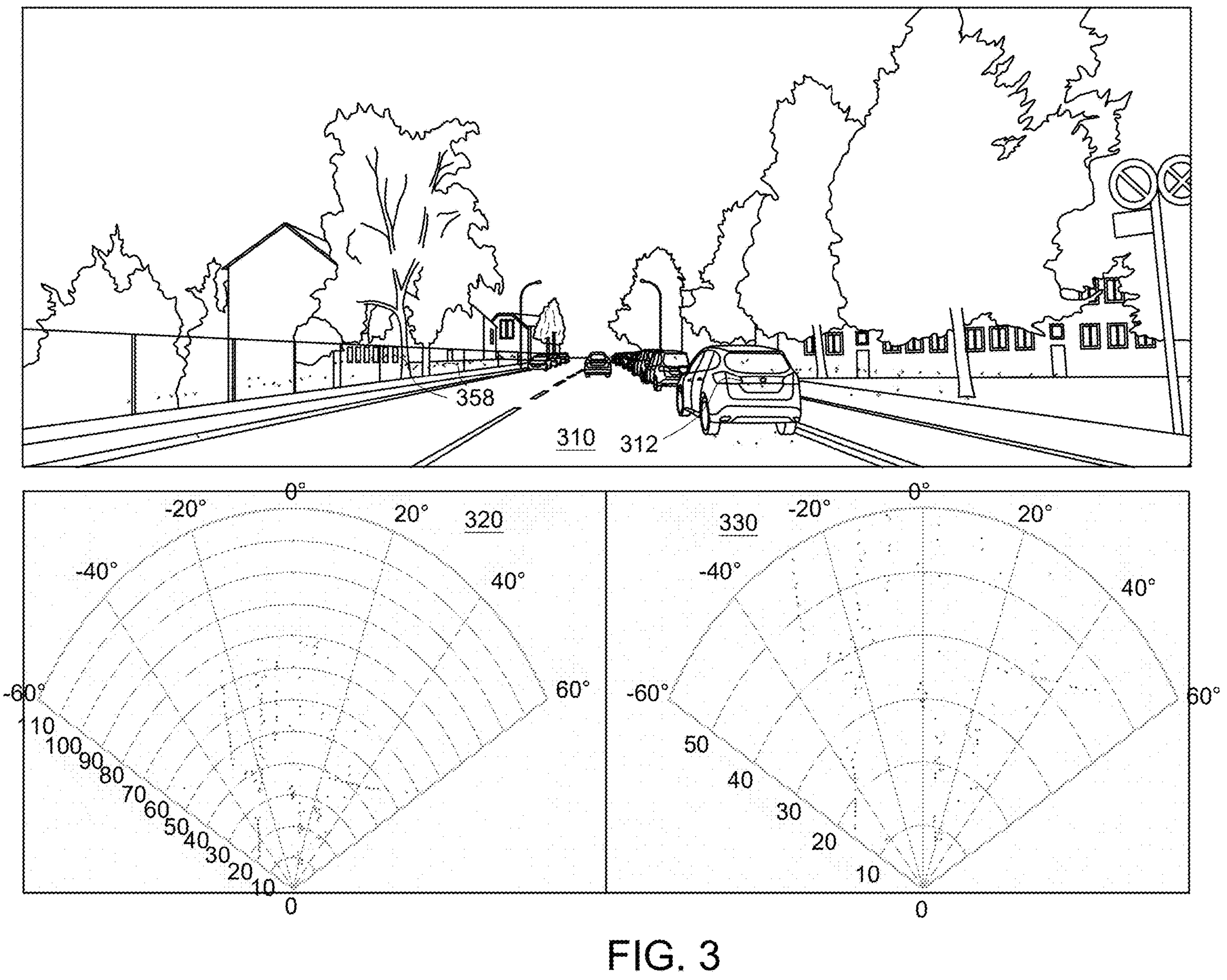
FIG. 3 illustrates an example of an image and various information.
Figure 4:
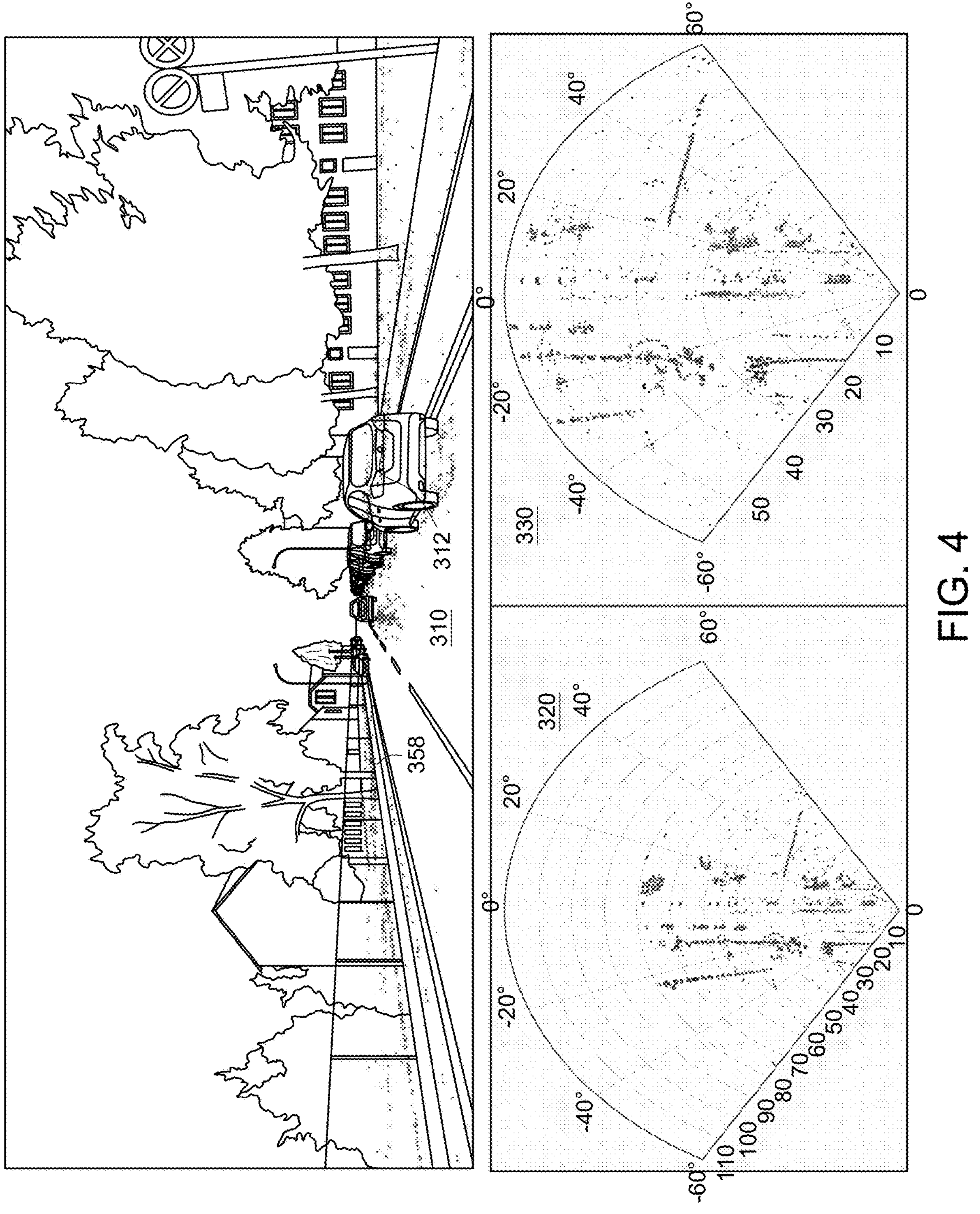
FIGS. 4-7 illustrate an example of iterations of a step of the method of FIG. 1.
Figure 5:
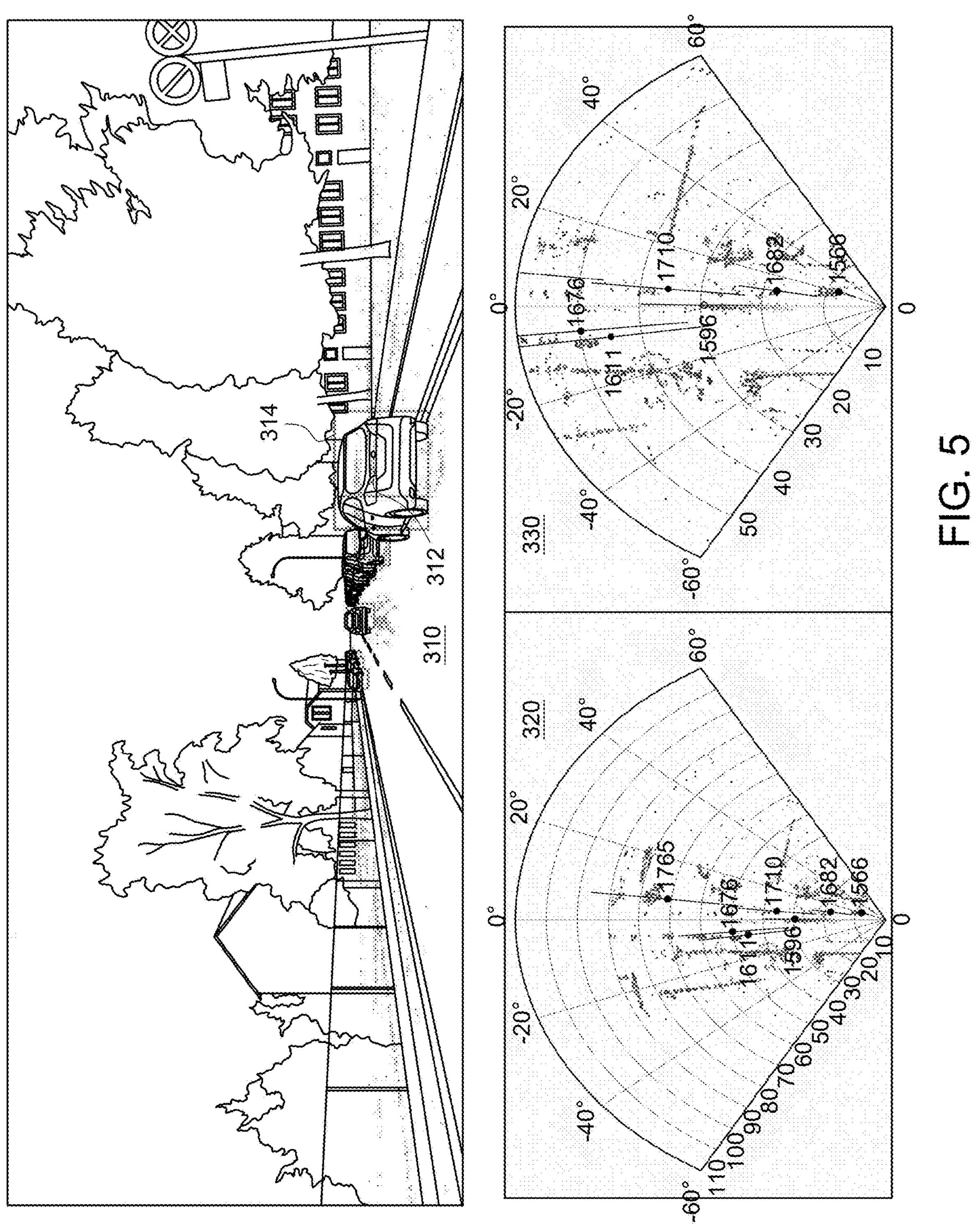
Figure 6:
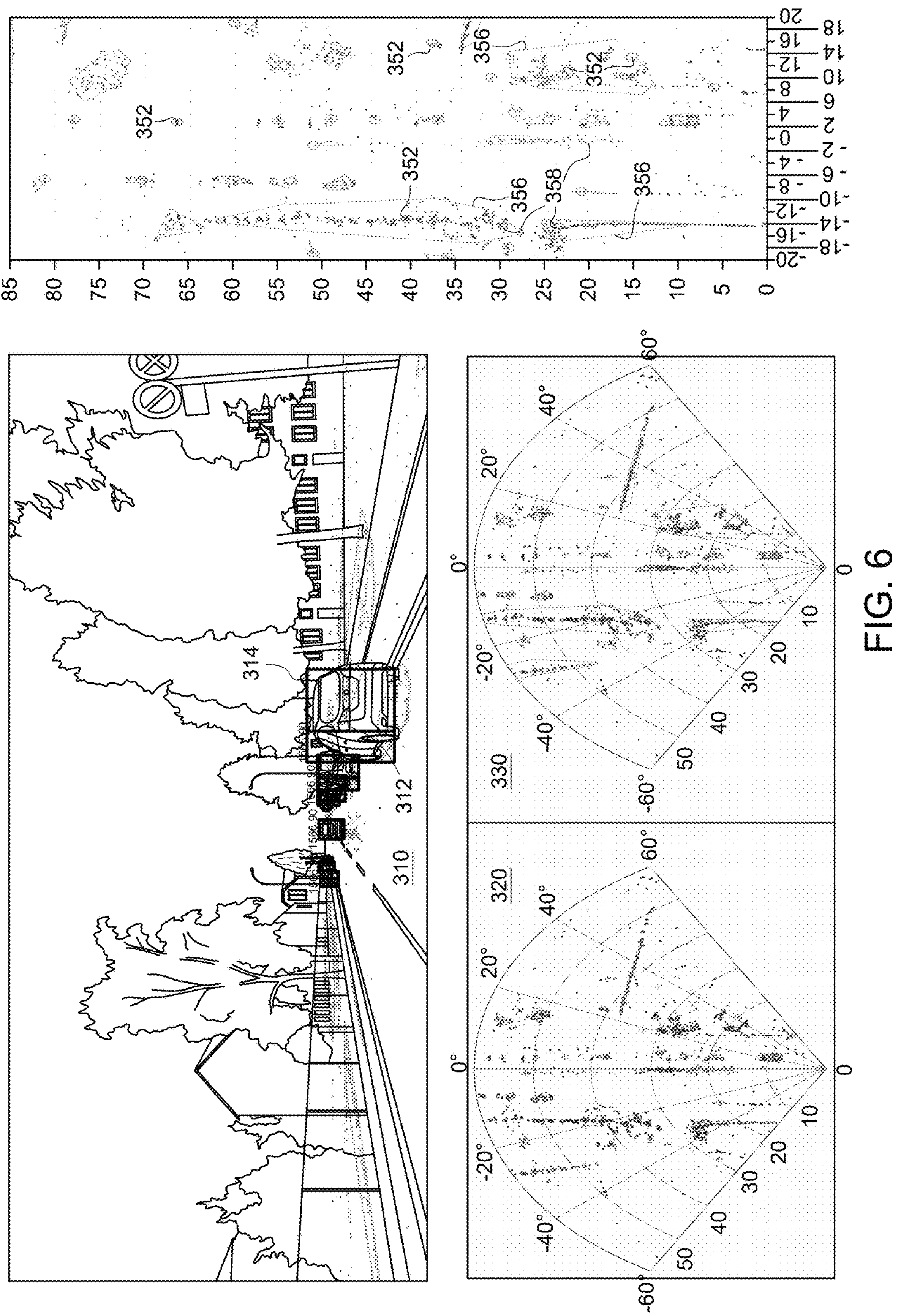
Figure 7:
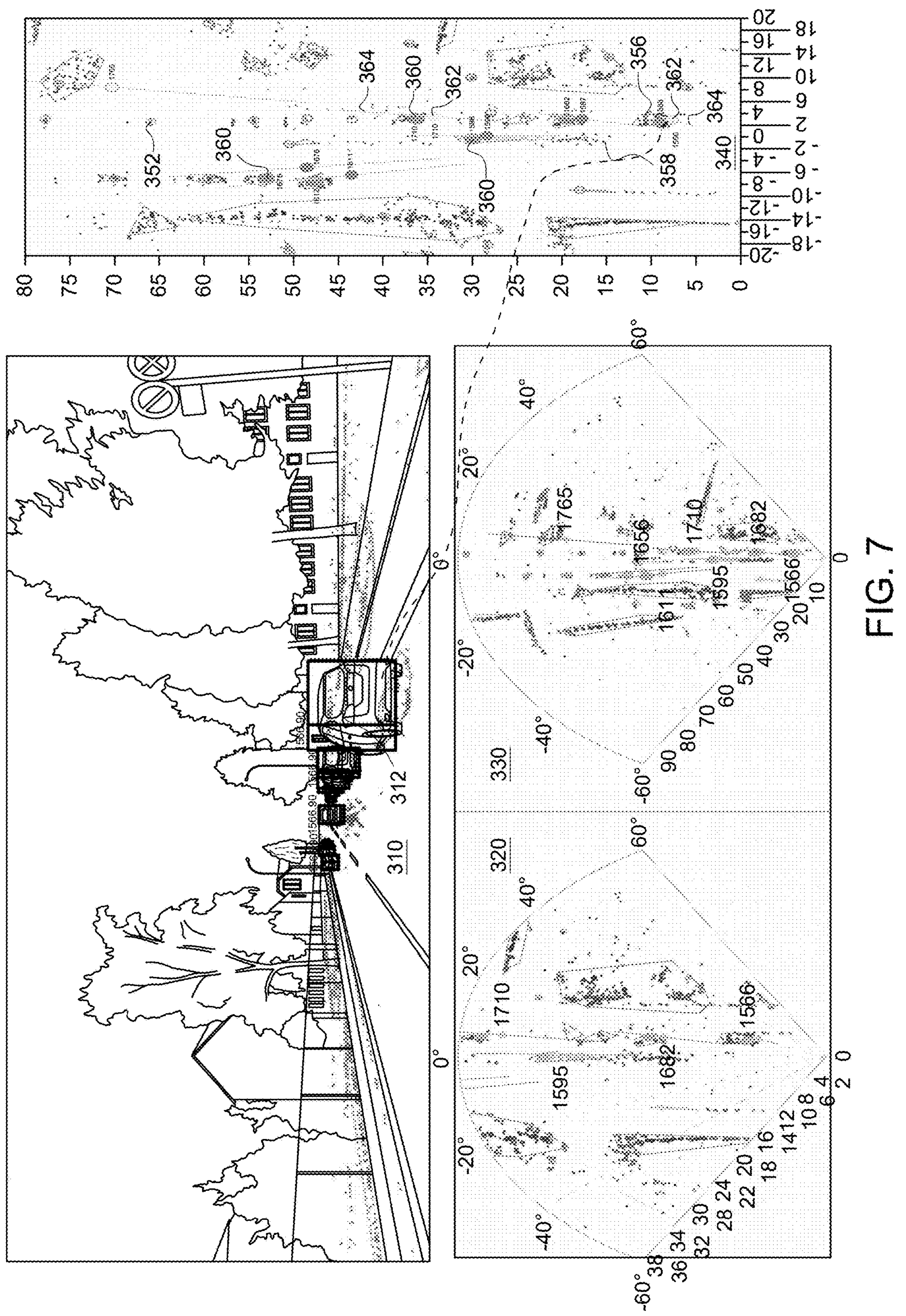

FIGS. 3-7 illustrate an image 310 that may include additional information, a radar angle to range (RAR) display 320 and an enlarged RAR display 330. Various radar points include grayscale information that represents their speed. FIGS. 6-7 also illustrate a hybrid display 340 that illustrates visual and radar information.

a. FIG. 3 illustrates phase in which the image 310 with object 312, the image is overlaid with radar points 358 from a single radar scan. The RAR display 320 and the enlarged RAR display 330 illustrate the radar points from a single radar scan.
b. FIG. 4 illustrates phase in which the image 310 with objects such as vehicle 312, the image is overlaid with radar points 358 aggregated from multiple radar scans. The RAR display 320 and the enlarged RAR display 330 illustrate the radar points aggregated from multiple radar scans.
c. FIG. 5 illustrates phase in which the image 310 is overlaid with radar points aggregated from multiple radar scans. Objects such as vehicle 312 of image 310 are surrounded by bounding boxes 314. The RAR display 320 and the enlarged RAR display 330 illustrate the radar points aggregated from multiple radar scans and also illustrates estimated locations of objects (labeled 1676, 1611, 1569, 1 by 682 and 1566) and their distance ambiguity is shown as radial lines that pass through the objects.
d. FIG. 6 illustrates a phase in which the image 310 is overlaid with radar points 358 aggregated from multiple radar scans. Objects such as vehicle 312 of image 310 are surrounded by bounding boxes 314. The RAR display 320 and the enlarged RAR display 330 illustrate RDB objects and some groups of radar points surrounded by boundaries 356. The hybrid display 340 illustrates visual and radar information such as RDB objects 352 and radar points 358.
e. FIG. 7 illustrates a phase in which the image 310 is overlaid with radar points 358 aggregated from multiple radar scans. Objects such as vehicle 312 of image 310 are surrounded by bounding boxes 314. The RAR display 320 and the enlarged RAR display 330 illustrate RDB objects and some groups of radar points surrounded by boundaries 356. The hybrid display 340 illustrates HDB objects 360 in addition to visual and radar information such as RDB objects 352 and radar points 358. The hybrid display also illustrate the location of VDB objects 362 and their region of interest 364 that represents the distance ambiguity. One of the HDB objects is vehicle 312—linked by a dashed line to its DDB object representation.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for fusion of radar and visual information, the method comprises:

obtaining visual information and radar information about a three dimensional (3D) space located within a field of view of a camera that acquired the visual information and within a field of view of a radar that acquired the radar information;

finding, following the obtaining and based on the visual information, estimated visual-detection-based (VDB) objects and estimated VDB locations of the estimated VDB objects within the 3D space; wherein the finding of the estimated VDB locations exhibits a distance inaccuracy that are represented by a distance ambiguity that is either a certain percent of the distance inaccuracy or certain amount of distance;

determining, following the obtaining, hybrid-detection-based (HDB) objects and HDB locations of the HDB objects, based on (i) the radar information, (ii) the estimated VDB objects, and (iii) the estimated VDB locations of the VDB objects, wherein determining the HDB objects and HDB locations comprises solving the distance ambiguity of the estimated VDB locations using the radar information by searching for radar-detection-based (RDB) objects within regions of interest defined by the estimated VDB locations and the distance ambiguity of the estimated VDB locations; wherein the distance ambiguity is a range inaccuracy associated with estimation of locations that are based solely estimated VDB locations.

2. The method according to claim 1, further comprising displaying a radar angle to range (RAR) display and an image overlaid with radar points aggregated from multiple radar scans.

3. The method according to claim 1, further comprising displaying the regions of interest as spatial regions in the 3D space that extend radially from the camera along directions corresponding to the estimated VDB locations, with radial extents determined by the distance ambiguity.

4. The method according to claim 1 wherein the determining of the HDB objects and the HDB locations of the HDB objects comprises finding radar-detection-based (RDB) objects.

5. The method according to claim 4 comprising pairing RDB objects with VDB objects to provide the HDB objects and the HDB locations of the HDB objects.

6. The method according to claim 4 wherein the finding of the RDB objects is preceded by aggregating radar points from different points of time within a time window.

7. The method according to claim 4 wherein the finding of the RDB objects comprises aggregating radar points from different points of time within a time window.

8. The method according to claim 1 comprising responding to the determining of the HDB objects.

9. The method according to claim 8 wherein the responding comprises at least one of autonomously driving the vehicle based on the determining or performing an advanced driver assistance system (ADAS) operation.

10. The method according to claim 2 further comprising displaying, within an enlarged RAR display, the regions of interest as spatial regions in the 3D space that extend radially from the camera along directions corresponding to the estimated VDB locations, with radial extents determined by the distance ambiguity.

11. A non-transitory computer readable medium for fusion of radar and visual information, the non-transitory computer readable medium stores instructions for:

obtaining visual information and radar information about a three dimensional (3D) space located within a field of view of a camera that acquired the visual information and within a field of view of a radar that acquired the radar information;

finding, following the obtaining and based on the visual information, estimated visual-detection-based (VDB) objects and estimated VDB locations of the estimated VDB objects within the 3D space; wherein the finding of the estimated VDB locations exhibits a distance inaccuracy that are represented by a distance ambiguity that is either a certain percent of the distance inaccuracy or certain amount of distance; and determining, following the obtaining, hybrid-detection-based (HDB) objects and HDB locations of the HDB objects, based on (i) the radar information, (ii) the estimated VDB objects, and (iii) the estimated VDB locations of the VDB objects, wherein determining the HDB objects and HDB locations comprises solving the distance ambiguity of the estimated VDB locations using the radar information by searching for radar-detection-based (RDB) objects within regions of interest defined by the estimated VDB locations and the distance ambiguity of the estimated VDB locations.

12. The non-transitory computer readable medium according to claim 11, that further stores instructions for displaying the regions of interest as spatial regions in the 3D space that extend radially from the camera along directions corresponding to the estimated VDB locations, with radial extents determined by the distance ambiguity.

13. The non-transitory computer readable medium according to claim 11 wherein the determining of the HDB objects and the HDB locations of the HDB objects comprises searching for radar-detection-based (RDB) objects within regions of interest defined by the estimated VDB locations of the estimated VDB objects and the distance ambiguity of the estimated VDB locations of the VDB objects.

14. The non-transitory computer readable medium according to claim 11 wherein the determining of the HDB objects and the HDB locations of the HDB objects comprises finding radar-detection-based (RDB) objects.

15. The non-transitory computer readable medium according to claim 14 that stores instructions for pairing RDB objects with VDB objects to provide the HDB objects and the HDB locations of the HDB objects.

16. The non-transitory computer readable medium according to claim 14 wherein the finding of the RDB objects is preceded by aggregating radar points from different points of time within a time window.

17. The non-transitory computer readable medium according to claim 14 wherein the finding of the RDB objects comprises aggregating radar points from different points of time within a time window.

18. The non-transitory computer readable medium according to claim 11 that stores instructions for responding to the determining of the HDB objects.

19. The non-transitory computer readable medium according to claim 17 wherein the responding comprises autonomously driving the vehicle based on the determining.

20. The non-transitory computer readable medium according to claim 17 wherein the responding comprises performing an advanced driver assistance system (ADAS) operation.

21. A system for fusion of radar and visual information, the system comprises a visual sensor, a radar and a processor;

wherein the visual sensor is configured to acquire visual information about a three dimensional (3D) space;

wherein the radar is configured to acquire radar information about the 3D space;

wherein the processor is configured to find, based on the visual information, estimated visual-detection-based (VDB) objects and estimated VDB locations of the estimated VDB objects within the 3D space; wherein the finding of the estimated VDB locations exhibits a distance inaccuracy that are represented by a distance ambiguity that is either a certain percent of the distance inaccuracy or certain amount of distance; and wherein the processor is configured to determine, following an acquiring of the visual information and of the radar information, hybrid-detection-based (HDB) objects and HDB locations of the HDB objects, based on (i) the radar information, (ii) the estimated VDB objects, and (iii) the estimated VDB locations of the VDB objects, wherein determining the HDB objects and HDB locations comprises solving the distance ambiguity of the estimated VDB locations using the radar information by searching for radar-detection-based (RDB) objects within regions of interest defined by the estimated VDB locations and the distance ambiguity of the estimated VDB locations.

* * * * *